United States Patent
Kostel et al.

[15] 3,685,258
[45] Aug. 22, 1972

[54] ELECTRONIC AIR PURIFIER

[72] Inventors: Paul Steven Kostel; William Earl Borgen; Richard Joseph Willert, all of Yankton, S. Dak.

[22] Filed: Jan. 18, 1970

[21] Appl. No.: 107,253

[52] U.S. Cl. ..................55/129, 55/138, 55/139, 55/143, 55/146, 55/147, 55/149, 55/151, 55/154, 55/467
[51] Int. Cl. ............................................B03c 3/32
[58] Field of Search........55/108, 110, 124, 126, 128, 55/129, 130, 136, 137, 138, 139, 140, 141, 142, 143, 145, 146, 147, 149, 150, 151, 154, 156, 467, 470, 471, 472

[56] References Cited

UNITED STATES PATENTS

| | | | |
|---|---|---|---|
| 2,813,595 | 11/1957 | Fields | 55/137 |
| 2,873,000 | 2/1959 | Elam | 55/143 X |
| 2,925,881 | 2/1960 | Berly et al. | 55/145 |
| 3,626,669 | 12/1971 | Cardiff | 55/108 X |

Primary Examiner—Dennis E. Talbert, Jr.
Attorney—Sol B. Wiczer

[57] ABSTRACT

A portable electronic air purifier having a dust precipitating cell assembly of high voltage aligned plates and an ionizing wire secured at each cell side by polyacrylate polymer, the cell being manually insertable into a housing which supports a pair of spring contacts, one at each cell side, each to frictionally engage a group of plates of the same polarity when the cell is inserted to make the high voltage circuit through the cell and break the circuit when the cell is manually withdrawn for cleaning. The cell may be of numerous, closely spaced high voltage plates operated by a doubled circuit supplied at about 5,000 volts DC produced by a doubler circuit encased in plastic to further reduce arcing.

31 Claims, 14 Drawing Figures

PATENTED AUG 22 1972

INVENTORS
PAUL STEVEN KOSTEL
WILLIAM EARL BORGEN
RICHARD JOSEPH WILLERT
BY

Sol B. Wicker
ATTORNEY

INVENTORS
PAUL STEVEN KOSTEL
WILLIAM EARL BORGEN
RICHARD JOSEPH WILLERT
BY Sol B Wiger
ATTORNEY

INVENTORS
PAUL STEVEN KOSTEL
WILLIAM EARL BORGEN
RICHARD JOSEPH WILLERT
BY

*Sol B. Wiczer*
ATTORNEY

ELECTRONIC AIR PURIFIER

This invention relates to an electronic dust precipitator and includes several improved features directed to making the device more useful by individuals. More particularly, the present invention provides a small, portable household or office air purifier unit having numerous built-in features which improve the dust precipitation efficiency, the ease of operation including ease of cleaning, and lifetime of rugged useful operation as well as overall safety of the device in use.

Electrical precipitation of ionized particles suspended in gas as a means of removing dust and other ionizable particles from air is an old art. However, devices having this utility are improved in several aspects to make them more practically useful as a household device, particularly as a small portable unit dust precipitator by solving several problems. Outstanding among these is the fact the electrical precipitation requires very high voltages, and the unit hereof for increased efficiency even has unusually high plate voltages, as high and sometimes exceeding 5,000 volts, which imparts an increased tendency to arcing destruction of its structural elements.

A further factor is that a dust precipitator needs to have its dust collector cell frequently cleaned to remove the precipitated dust and other air-suspended particles such as smoke, pollen and fog, and the manual handling of the dust collector cell in the area of such high voltage presents one obstacle to designing of a device which is practical for common commercial use by individuals.

A further problem is that at high voltage of this character there is a tendency for short circuitry by construction with poor materials, or assembly in a poor design, or by mishandling, each presenting a danger factor. There is also a possibility of constant formation of ozone by electrical discharge including short circuitry which in itself is an undesirable contaminant in the air being cleaned or purified.

It is one object of this invention to provide an air purifier operative to electrically precipitate dust and other suspended particles from the air with great efficiency and incorporating important utility and safety factors such that the device has a long, useful life and rugged resistance to self destruction while being safely useable by individuals.

It is a further object to provide an air cleaner that is more convenient and easy both to operate and clean by the individual unskilled user.

In one aspect of this invention, the filter cell of high voltage is completely removable for cleaning at desired, even short, intervals by the user, and is so constructed that it is operative as a group of high voltage plates which may be manually inserted into the circuit by the user without personal danger despite the very high voltage which may be carried by the circuit, and removed, the entire cell plate assembly being cleanable as such without need to separate the plates; and the assembly may then be reinserted into the circuit without possible short circuitry or breakdown of high voltage between the parts.

In a further aspect, a pair of helically wound spring contacts are mounted within the body of the device each to intercept either a positive or negative group of plates alternately assembled into a tier of plates to form a collector cell. An extending corner of the plates of one group may complete the circuit, completing contact between the spring and with each plate of the group; and at the opposite side of the cell, the extending plate corners of the alternate group of plates alone will come into contact with a second spring contact, the extending plate corners being preferably embossed for firm contact with the spring by each plate.

In another aspect of this invention, the negative plates in the circuitry are self-grounding. If a short circuit develops between the plate before the positive plates of the cell are disengaged from the high voltage circuit, the user will be protected by such grounding. A spring arm in contact with the negative plates has an extended mechanical current grounding effect whereby upon separation of the precipitator cell from the device, even residual negative plate voltages are grounded as the cell is withdrawn.

In another aspect, the plates of the cell are separated and supported by dielectric inorganic or stable organic plastic, preferably polyacrylate, which will not form a carbon path under short circuiting arcing.

In a further aspect, polyacrylate side pieces are used to support the plates and ionizing wires of the cell, whereby it is possible to support a large number of plates, and, as desired, in closer proximity to each other as closely spaced high voltage plates, the cell assembly being easily removed and cleaned as a unit.

In a further aspect, a fan is mounted with its impeller below the cell outlet in a substantially horizontal plane, below the stream of air passing through the cell, so that air passes through the cell generally in a horizontal to diagonally downward stream through the impeller, passing out through grills in the back and lower rear of the housing.

In a further aspect, the high voltage output of the transformer is both rectified and doubled, using a voltage doubler circuit to supply a high plate voltage to the cell. The cell operated at the doubled high voltage may be formed of numerous, desirably closely spaced plates in a highly compact assembly.

In a further aspect of this invention, high voltage elements of the rectifier circuit are separately encapsulated in a protective case to avoid moisture penetration and possible mechanical deformation of elements to reduce the possibility of arcing of high voltage elements of the circuit. An advantage is that the high voltage, available in the encapsulated rectifier circuit, is more safely doubled. This encapsulation has made it feasible to provide a power pack of very compact, dimensionally small size. Similarly, the total design hereof is directed to maximum encasement of parts which could possibly emit a corona discharge; or which might allow short circuiting by or during mechanical handling; or which can be caused by dust or moisture accumulation; whereby the device has optimum safety.

Other features are further described in the details given or will be inherent in the device as shown and as further described with reference to the drawings wherein.

Figure 1:
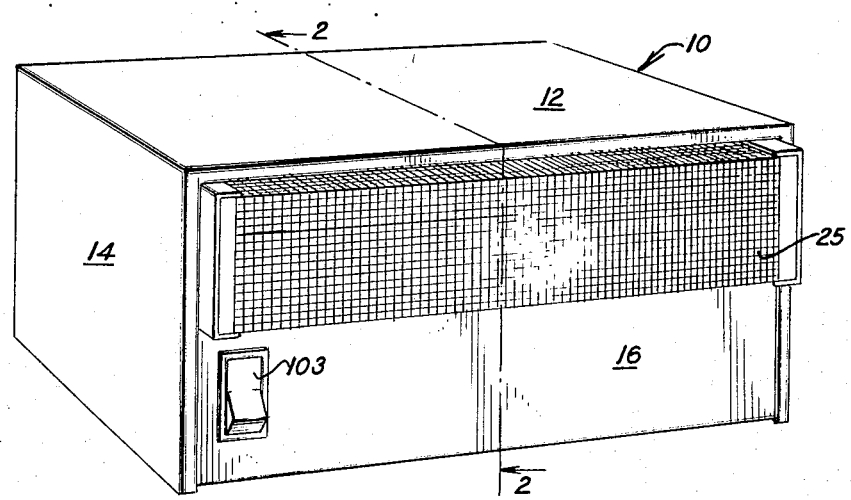
FIG. 1 shows the assembled device in perspective.
Figure 2:
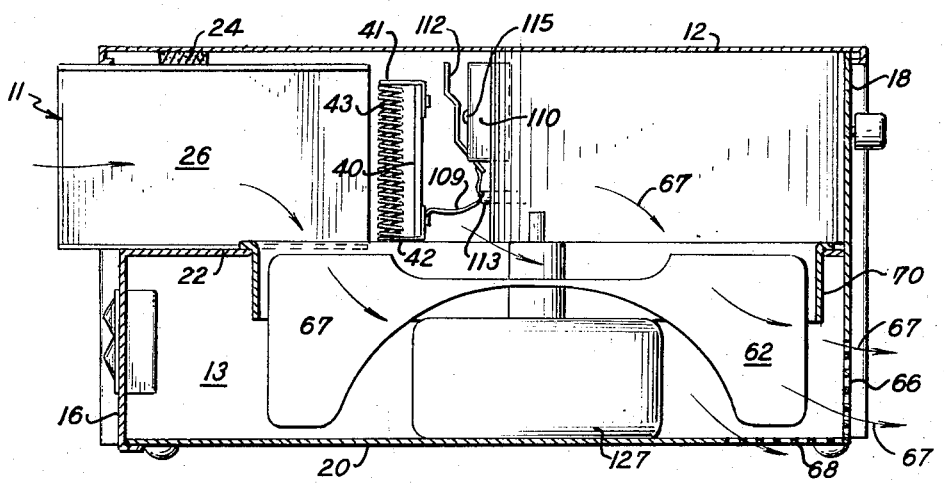
FIG. 2 is a sectional view of the casing taken through FIG. 1 along the line 2—2 with the cell removed.
Figure 13:
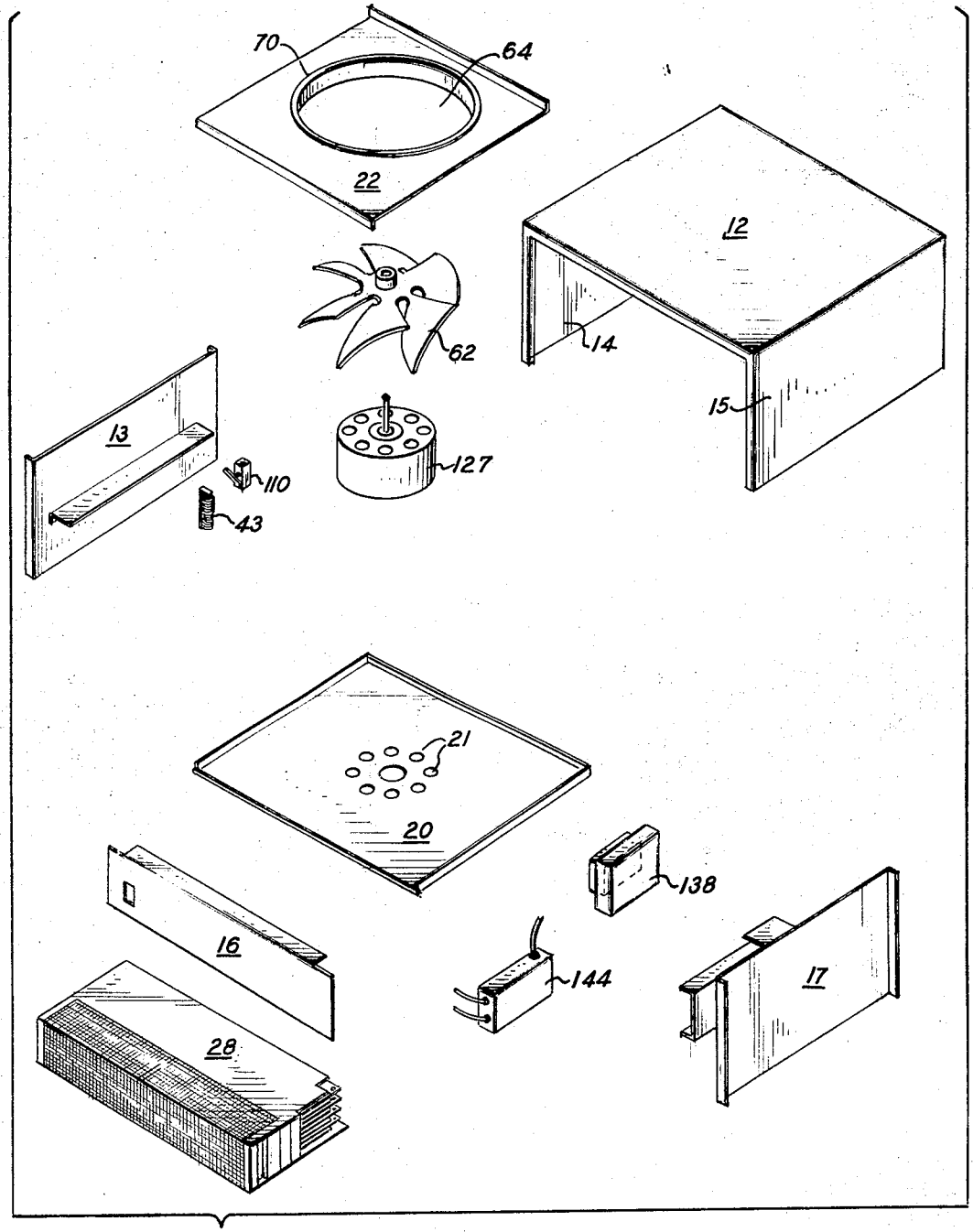
FIG. 13 is an exploded perspective view of the parts for assembly of the unit.

Referring first to FIGS. 1 and 2, the device comprises a low profile housing 10, preferably formed of a rectangular top 12, and left and right sides 14 and 15, and imperforate lower cross brace 16 in front, and an upper crossbrace 18 in back, all of metal, with a metallic bottom 20. An intermediate layer comprises a metallic venturi plate 22 mounted centrally horizontal and parallel to top and bottom, all walls being electro-conductively secured together. Urethane gasket strips 24 are mounted about the dust collector cell 28 for soundproofing. The side wall 14 supports an inner wall 13 thereon spaced and insulated therefrom, the wall 13 serving as a ground conductor plate (as shown in FIG. 13). Similarly, side wall 15 supports an inner wall 17. The several panels—sides, top and bottom, as well as cross members—are of metal to form a compact, rugged construction in use which carries grounding circuitry.

A pair of plastic channel tracks 26 are mounted to inner walls 13 and 17 in the upper part of the front end of the device on each side of the housing opening 11 to receive the dust collector cell 28 in sliding fit therein.

Figure 6:
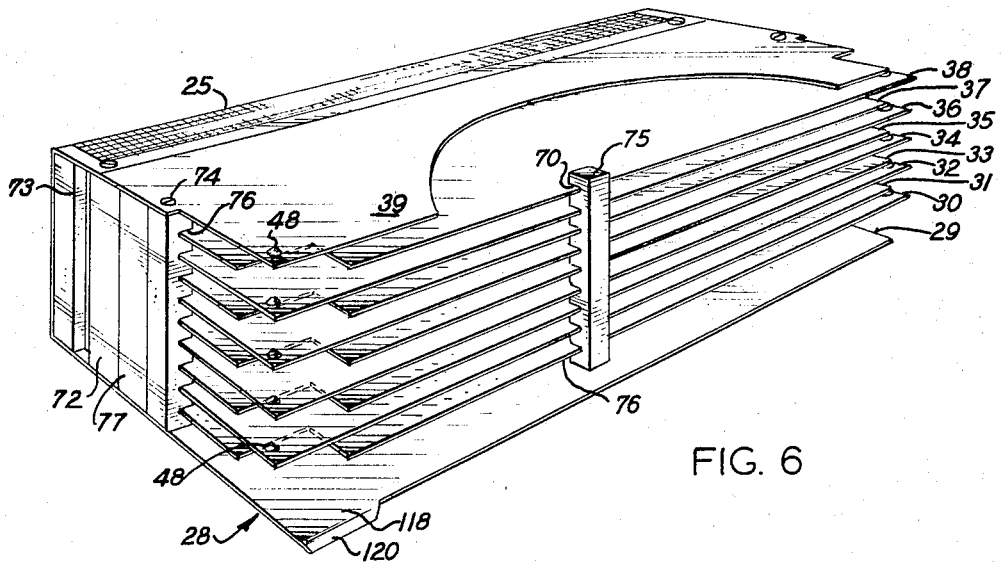
FIG. 6 is a perspective view of the inverted filter cell showing the notching of plate groups and plastic plate supports.

The collector cell 28 comprises groups of plates protected at their outer ends by a grill 25 (FIGS. 3, 6 and 9), the cell being shown inverted in FIG. 6. Positive plates 30, 32, 34, 36, 38, etc., have their corners notched at one end and alternate with negative plates beginning with top plate 29 and continuing 31, 33, 35, 37, 39, there usually being at least eight and preferably nine to 13 plates, the closely assembled positive and negative plates alternating as shown. The forward end of the cell comprises grill 25 through which air enters the cell and becomes ionized by contact with high voltage wire 52 as described further below, and passes thence over the highly charged plates as shown by the arrows 27.

Figure 3:
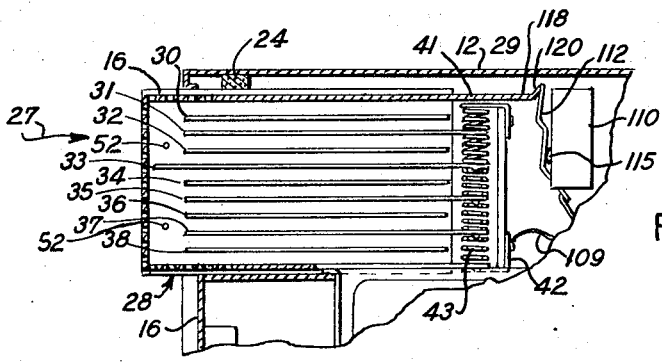
FIG. 3 is a detail showing the mounting of the cell with the negative plates in circuit-completing position in the unit.
Figure 4:
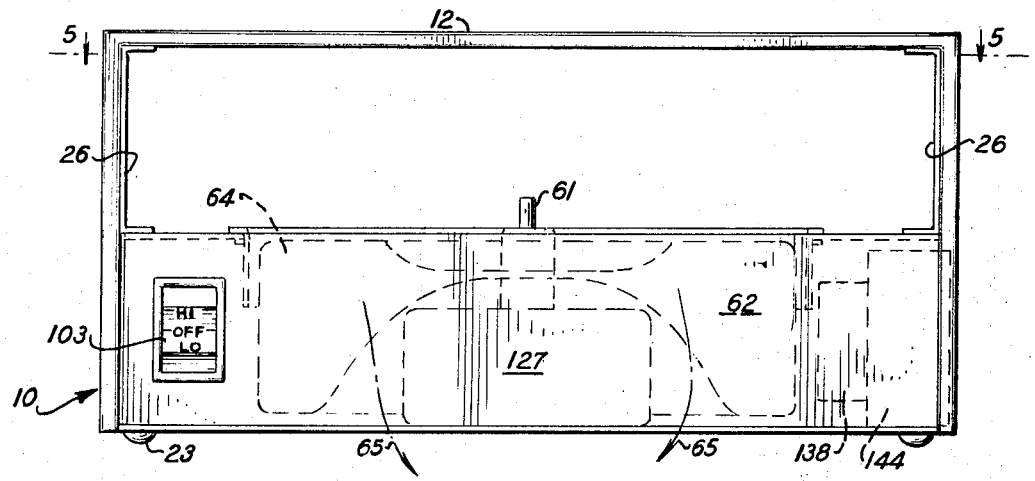
FIG. 4 is a front elevation with the cell removed showing the position of the fan with respect to the cell.
Figure 8:
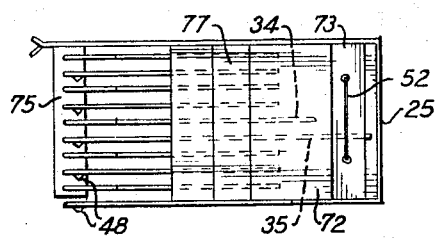
FIG. 8 is a left hand view of the filter cell.

As shown in FIGS. 3, 6 and 8, the top plate 29 has a protruding corner 118 flanged at 120 engaging a switch 110 depressing switch arm 112 in inserting movement of the cell against actuator 115 both to complete the power supply to line 114 and to complete the grounding circuit at 113 to the housing.

A plastic angle bar 40 is bolted to an inner wall 13 of the unit, supported by the wall 14, and carries brackets 41 at the top and 42 at the bottom, the protruding ends of the brackets within the plastic angle bar 40 supporting resilient means such as a spring 43 between them, usually in tension, whereby the spaces between the spring form resilient helical plate contacting slots or grooves per se with the extending corners of the several negative plates in the cell. The left hand end of the cell as shown in FIGS. 2 and 3, in section, has the spring 43 in contact with the negative plates 31, 33, 35, 37 and 39, the spring contact 43 being grounded at 113 by a lead line 109 to the side wall 14 of the housing and further by way of top plate 29 and resilient switch arm 112.

Figure 5:
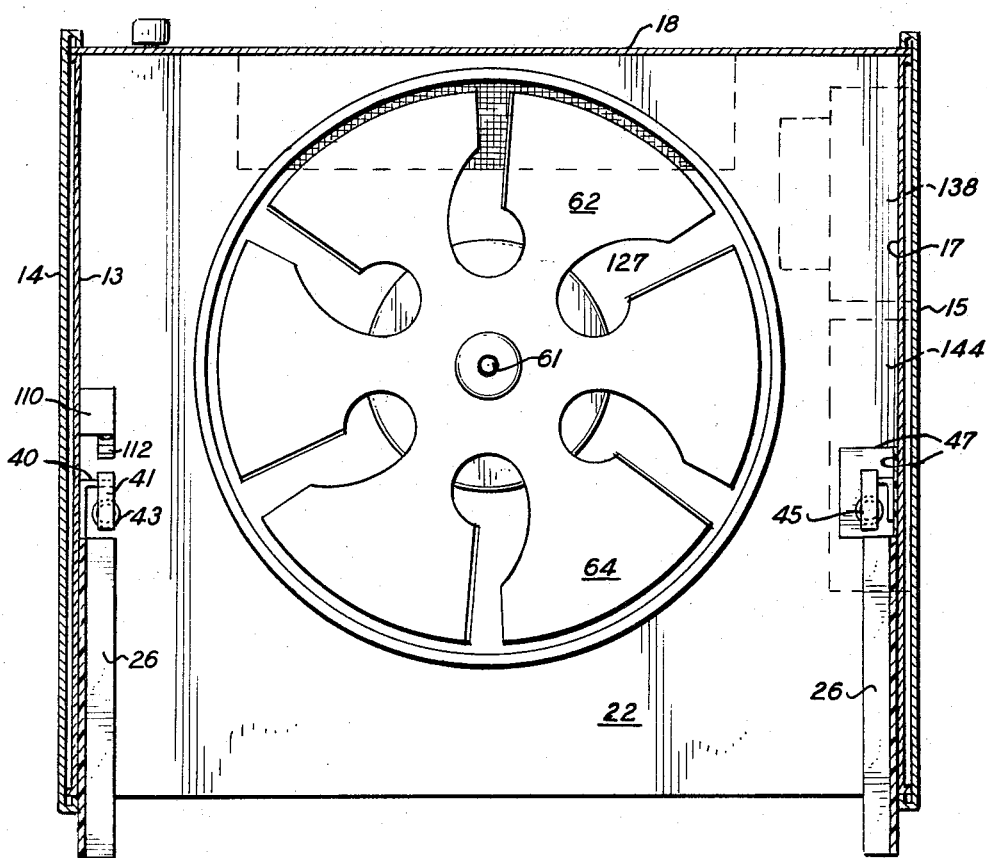
FIG. 5 is a top plan view of the unit with the top wall of the cell removed, showing the position of the fan and the enclosed electrical elements, taken on the line 5—5 of FIG. 4.
Figure 7:
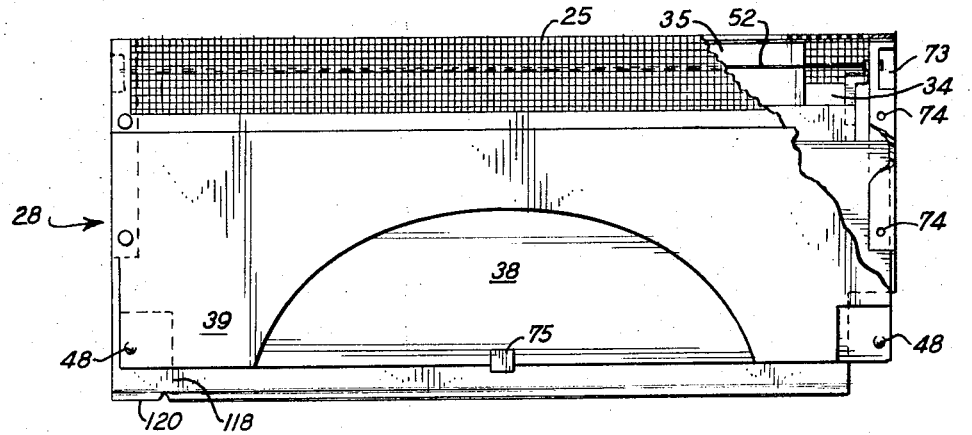
FIG. 7 is a bottom plan view of the filter cell.
Figure 9:
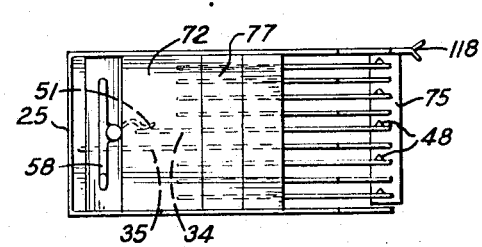
FIG. 9 is a view of the right end of the filter cell.

The right hand section of the cell has extending corners comprising positive plates of the cell, as shown in FIGS. 6 and 7 [inverted] and FIG. 9. These plates 30, 32, 34, 36 and 38 at their extending opposite corners fit into and firmly but resiliently contact a similar spring 45 (FIG. 5), those unnotched plates at the right hand side alone extending for contact with the resilient coils of the spring 45 for completing the positive circuit thereto. The spring 45, however, is insulated from the metallic side wall 15 by a plastic insulator sheet 47 and has its positive circuit completed by way of a contact leading from the high voltage output line 156 from the rectifier circuit, encased within the dotted line portion 144 as shown in detail in FIG. 12.

In this manner the high voltage positive current passes directly to plates 30, 32, 34, 36 and 38, to which it applies a high voltage positive charge, inducing a negative charge upon alternating grounded plates 31, 33, 35, 37 and 39, grounded through the opposite spring contact 43 and switch arm 112. The extending corners of the plates at each opposite side of the cell carry an embossment which may be a protruding nib 48 or dimple, one at each extending plate corner cooperating with the spring coils 43 and 45 for forming a firm surface with the portion of a spring adjacent each plate edge, whereby the edge of a plate inserts between the helices of the coiled spring in tension, separated barely sufficient resiliently to receive the edge of a plate between the helices, the extending nibs 48 supplying in any position of the coiled contacts 43 and 45 firm electrical contacts between the spring and each of the plates, at whatever height the several plates may be disposed. Thus, a plate edge may be even slightly bent or dimensionally inaccurately spaced one plate from the next, but the nibs 48 cooperating with the springs 43 and 45 allow for rugged operation to insert or remove the cell with easy making and breaking of the electrical contacts between the assembled plates of the cell and the springs.

Figure 10:
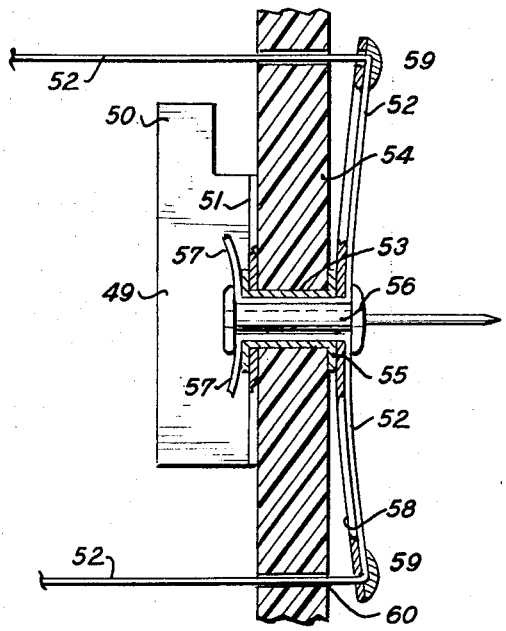
FIG. 10 is a detail in section showing the mounting of the high voltage electrical ionizing wires through the acrylic side pieces of the collector cell.
Figure 11:
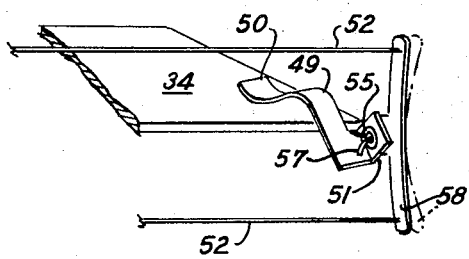
FIG. 11 is a perspective view of a detail showing the manner in which the spring clip contacts a high voltage plate.

One of the central negative plates 35 extends far forward of the remaining plates, terminating just short of the grill 25. Another of the centrally disposed positive plates, preferably the central plate 34, as shown in FIGS. 7, 9 and 11, extends forward toward the grill 25 inlet a shorter distance, being set forward of the remaining plates a distance only sufficient to form a positive electrical contact to supply current to a pair of forwardly disposed ionizing wires 52. For this purpose a spring clip 49 (FIGS. 10 and 11) has one end 50 disposed upon the forward protruding surface of plate 34 for firm, resilient contact therewith and has its inner end 51 eyeletted to the acrylic side piece 54. Thus the clip is supported by eyelet 55 through hole 53 in side piece 54. A rivet 56 is passed through the hole in the eyelet and the inner ends 57 of the wires 52 are secured between eyelet 55 and rivet 56, wires 52 extending outward from the rivet along a spring bar 58 forming a yoke, over which the tungsten wires 52 continue. The wires 52 pass over the ends of spring bar 58, and return through holes 60, passing from side to side of the collector cell 28, the tungsten wires 52 reaching the opposite side of the cell as shown in FIG. 8, passing again through tiny bore holes 60 in the opposite plastic side piece 54, and returning to allow riveting of both open ends of the wire. The tungsten wires thus extend from side to side of the cell, with its ends 57 being secured within the eyelet 55 and rivet body 56.

In the act of securing by pressing the rivet members tightly together within bore hole 53, the tungsten wire 52 being placed as shown, forces spring arm 58 ends outwardly away from the plastic side piece 54, thus causing considerable tension to be placed upon the wires 52 merely by the act of riveting, the tension being held by the outwardly extending spring arms 58. The plastic side pieces 54 have rectangular notches 73 cut their height into which the spring bar 58 and wire 52 holes 60 are bored. It is possible, moreover, with this construction to increase or replace the tension in the wires 52 as it becomes reduced in use. Thus, if the wires become relatively loose in use, one can manually pull both ends of spring arms 58 outward of the plastic side member 54, thus to manually restore the tension to wires 52. It is desirable, but not essential, to more securely fix the wires 52 to the arms of spring bar 58. For this purpose blobs of solder 59 are coated over the wires and upon opposite ends of the spring bar 58. In this manner the high voltage circuit becomes completed from the plate 34 through the spring clip contact 50 and thence to the tungsten wires 52 which pass in a loop from side to side of the collector cell supported in small holes 60 bored in the plastic side support elements 54. This structure fixes and maintains the wires 52 in tension while carrying a high voltage ionizing charge disposed forward of the assembly of plates for ionization of air entering through the grill 25 of the collector cell 28.

As thus described, the collector filter cell 28 is constructed to allow air to enter through the open grill and pass over the several plates first in contact with high voltage ionizing wires 52, and thence in contact with plates each maintained at high voltage assembled as alternate positive and negative plates. The positive group of plates have their corners extending and insertable into the helical coils of a spring contact 45 for completion of the circuit through each, and the negative plates have their corners extended similarly for completion of the high voltage circuit by way of the coils of spring contact 43. The spring contact 45 receives a high voltage charge from doubler outlet supply line 156 and spring contact 43 is grounded to the housing.

Figure 12:
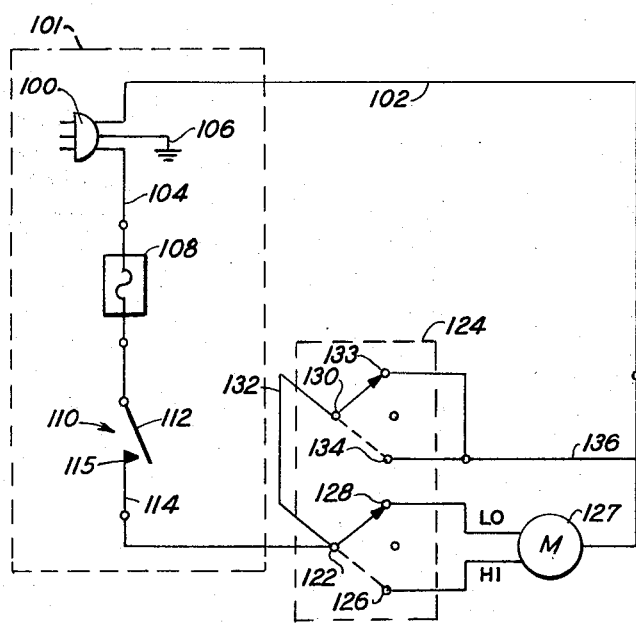
FIG. 12 is a circuit diagram.

As shown in FIG. 12, the circuit includes an inlet supply section 101 including a safety switch 110; a motor 127 and high-low and off-on switching circuit section 124; a transformer 138 and a voltage doubler circuit section 144. The current is supplied by way of a plug 100 taking a normal household current at 110 to 115 volts alternating current, branching through a lead 102 and a lead 104, there being a third conventional ground lead 106 at the plug 100 which is also connected to the housing wall 13. The circuit lead 104 passes through a fuse 108 and thence to an interlock switch 110. The switch 110 comprises a resilient spring arm 112 which is mechanically pressed by the extending top plate 29 of the inserted cell against contact 115, completing the circuit to line 114 when the collector cell 28 is in operative position in the device.

A common terminal 122 leads to a high speed contact 126 on the fan motor 127 or, alternately, to a low speed contact 128 on the motor 127, the motor having a built-in multitapped field between the contacts whereby the speed of the motor is controllable by position of the off-on switch 103 shown in the dotted line block 124. The terminal 130 is also connected to terminal 122 by way of lead wire 132, interconnecting the terminals 133 and 134 and passing thence to the primary lead 136 of the transformer 138.

The entire circuitry enclosed within the dotted line block 144 is a doubler, operative to double the output of the transformer 138, whose normal output is 2,500 volts AC to 5,000 volts DC as doubled output through line 156. As shown, the capacitive doubler comprises in a leg 140 of the circuit a capacitor 142 combined with a rectifier 146 to provide one output phase of the voltage doubler passing through line 148 and through resistor 150. The second phase of the voltage developed in line 141 passes through a rectifier 149, which is combined with capacitors 152 and 154 to in effect double the full voltage by the output of the second phase when the current reverses. The doubler, encased within a plastic protective block 144, develops 5,000 volts direct current in output line 156 which passes to the dust collector cell plates, as described above.

The high voltage circuit 144 is protectively encased within a single block, preferably formed of an arcing resistive material such as high di-electric wax having a melting point of about 90° C and other di-electric materials that will meet this requirement may be substituted, whereby not only is the possibility of short circuit destructiveness reduced or eliminated, but the high voltage circuit itself is so protected as to avoid production of ozone in contact with surrounding air. Either effect is an important improvement in a device of this character.

The insertion of the cell 28 operates off-on switch 110, forcing the spring arm 112 into completed circuit with the contact 115 for normal operation with a completed circuit. It will be noted, however, as the cell 28 is removed, sliding outward upon guide members 26, the spring 112 resiliently follows the top plate 29, maintaining the grounding contact. Hence, the dust collector cell is removable for cleaning, and makes or breaks the input circuit as the cell is manually inserted with plate corners in firm contact with spring contacts 43 and 45 or removed therefrom for cleaning. As the cell 28 is removed, the spring arm 112 follows the negatively charged plates, removing so much of the residual charge as to allow safe manual handling of the cell for cleaning.

The motor 127 is bolted to the center of the bottom plate 20, the plate as shown in FIG. 13 around the motor being perforated with a ring of holes 21, allowing a small cooling stream of air as shown by arrows 65 to be diverted through the motor. The entire unit is supported on rubber spacers 23 at each corner so that it will stand raised from any supporting surface about one-fourth to one-half inch to allow air passage beneath the unit. The motor shaft 61 rotationally supports a fan 62, the fan being disposed within a venturi opening 64 in the center of the metallic venturi layer or shelf 22 positioned parallel to the bottom plate 39 of the collector cell 28.

The lower end of rear wall 18 has large outlet perforations or grill 66. Similarly there is another bottom grill, a strip of perforations 68 in the bottom 20 adjoining rear wall grill 66, so that the air passing through the cell 28 in the direction of the arrows 67 will divide, most of the air passing substantially horizontal and downward through the lower backside outlet grill 66, and a portion passing to the rear and downward to pass out through the lower grillwork 68. Thus the air entering through the grill opening 25 of the cell 28 moves horizontally across the plates of the cell, enters the top of the horizontally mounted and rotated fan blade 62 being impelled diagonally downward and to the rear of the unit, in effect passing diagonally outward. The larger portion of the air moves to the lower rear perforated outlet 66 and another portion through the bottom perforated outlet 68. Thus there is complete streamlined flow almost horizontally and partially downward by a large fan blade 62 mounted in a venturi to impell a relatively large flow of air horizontally through the unit and slightly downward and out. This design gives very efficient and compact propulsion of air through a comparatively small unit.

Figure 14:
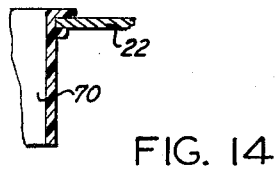
FIG. 14 shows the mounting of polyvinyl chloride strip about the venturi opening for the fan.

The large fan fills most of the open space of the venturi 22 as shown in FIGS. 2 and 13. The construction of the venturi and fan are of metal which would normally tend to vibrate. As shown in FIG. 14, an annular plastic collar 70 is mounted about the edge of the venturi layer 22, dampening the vibrations of the metal edge of the venturi and protecting the edges of the fan blades from any high speed vibrational impact of the fan blade against the metallic venturi 22, greatly dampening any noise effect therefrom.

Moreover, as mentioned above, the unit has plastic strips 24 of foamed urethane mounted in contact with various parts. For instance, the upper plastic foam strip 24 (FIG. 3) lies against the upper plate 29 of the cell 28 to avoid any vibrational noise from this source. Other possible sources of vibration of metallic units in the present construction is also sound insulated by imposition of urethane gasketing.

It will be noted the flow of air moving horizontally over the cell plates then passes downwardly into the fan. A substantial portion of lower plate 39 of the collector cell 28 is arcuately cut away, as shown in FIG. 6, near the annular edge of the venturi opening 64 to allow the collector cell unit to extend well into the venturi 22 opening 64 for downward flow of the air into the fan blade.

In earliest construction of a dust precipitator cell, for removal as a unit from the device, high voltage contact wires comprising electrically contacting pieces were manually placed into conductive contact with the several plates, furnishing contact with each plate. Upon separation of the cell from or return of the cell to the device, this conductive contact piece needed to be manually connected and disconnected. The present construction, it will be seen, is a substantial improvement over this prior practice in that no manual emplacement of individual contacts with each of the collector plates is necessary, but rather the present construction having alternate extended and cut away corners at opposite sides directly engages the spring contacts 43 and 45 emplaced at opposite sides of the cell described above, thus allowing simple manual emplacement of each plate in firm circuit contact with the springs being engaged by embossment 48 on the edges of the extending corner portion of each plate, whereby under pressure of the assembled cell plates being inserted, the plate edges make a firm contact with the springs and will not be displaced by any vibration of the unit in use.

Moreover, in earlier construction, the plates of the collector cell were assembled for temporary support by a series of grooves in plastic side pieces, usually formed of polyvinyl chloride. The several plates each were perforated near the side pieces, and a single securing pin, also of plastic, was placed through the several plate perforations not only for support of each plate in the side piece, but also to allow separation of the several plates for cleaning by first removing the pins, and then separating the plastic side pieces. Thus the collector unit was completely disassembled into individual plates for manual cleaning of each plate. This was a laborious task to daily clean each plate of the dust coated collector cell, requiring taking the cell apart down to each plate, and further necessitating skilled reassembly with the side pieces, manually pinning them together into a unit before reinserting the assembled cell into the dust collector device for use as a unit. This construction has now been greatly improved by finally sealing the plates into plastic side pieces 72 as shown in FIGS. 6, 7, 8 and 9. As described above, and as shown in FIGS. 8 and 9, the forward end 54 of the plastic side pieces 72 also support the ionizing wires 52 extending across the front end of the collector cell, these electrical elements being disposed in vertical notches 73. The top plate 29 and bottom plate 39 are further secured to the plastic side pieces 72 by small screws 74. A bracing plastic end support 75 is also mounted over the inner ends of the several plates, providing additional vertical support, securing these plates primarily against vibration. Since the plastic side pieces 72 are substantially permanently assembled with the plates, whereby the plates need not be disassembled, and particularly need not be disassembled for cleaning, they may be applied to the unit by casting in place in the original assembly or may be assembled merely by inserting the machined plastic side pieces against each plate, fitting the plates within a series of grooves 76 in the plastic side pieces. Similar construction comprising a series of grooves 76 is also present in the end piece 75.

It was found in earlier construction that various plastics such as polyvinyl chloride which had been used for first assembling plates and pinning them together into a unit as above described, allowed considerable arcing between plates across the polyvinyl chloride. The high voltage tended to break down the plastic material and form a conductive short circuiting passageway from plate to plate of carbon formed by decomposition of this plastic which, after short periods of use, rendered the cell inoperative. After study of numerous plastics as di-electric materials for side pieces, it was found that only the polyacrylate esters, usually a 1–4 carbon atom lower alkyl or alkenyl ester of acrylic or methacrylic acids, preferably polymethyl methacrylate, formed a suitable thermoplastic polymer. These were the only polymers which were found to be suitably stable to resist arcing, and particularly no break down of this material resulted in forming a conductive carbon short circuiting passageway between plates, even over long periods of use. In this respect the polyacrylate polymers, as thus described, are critically superior to other polymers tested, such as polyvinyl chloride. These polyacrylate esters alone form a good di-electric support material for the ends of the several plates.

Indeed, the polyacrylate ester was found to be so superior that the voltage applied to the plates could be even doubled without short circuiting break down of the polymer substance at such high voltages as 5,000 to 6,000 direct current volts. Moreover, it is found that the distance between plates with this type of side support polymer could be substantially reduced, allowing a useful cell to be made up of more plates, well exceeding the usual eight plate cell normally used at a voltage of about 2,500 volts alternating current. With the polyacrylate polymer side pieces as many as nine to thirteen plates can be used at double the voltage. The present construction allows a doubled voltage such as 5,000 to 6,000 volts upon a larger number of plates, whereby the dust collector is very greatly improved in efficiency.

It will be noted that while the side pieces may be cast or machined to support the plates at a selected distance, which may be comparatively small because of the arcing resistance of the polyacrylate polymer, these side pieces 54 perform other functions. Notably they are usually machined with grooves 76 to support both positive and negative plates of high voltage as pointed out above, and they also support the loop of the high voltage ionizing wire 52 positioned within the grill 25 and forward of the plates in suitable tension.

It should be further noted that the plates need not only to be firmly held by the acrylic, but must be exactly positioned therein for purposes of contacting of the total cell as it is slided inward of the housing for engagement of the spring contacts 43 and 45 as well as spring arm 112.

For this purpose, as shown in FIG. 6, the plates themselves may be further notched at opposite sides, assembled within the several grooves 76 of the side pieces, and the notched portions of the plates may then be filled in by a prismatic plug 77 extending the same height as the side pieces, the prismatic plug fitting into and filling the notched portions of the plates. The plug 77 is firmly sealed therein with adhesive. In this manner the plates after assembly with notched machined side pieces 54, to high dimensional accuracy of the assembled plates in the cell, are fixed by insertion of the plug 77 which may be set therein by a film of adhesive.

Finally, it is found that using the polyacrylate side piece construction, resistant to decomposition under high voltage short circuiting, the collector cell even having such larger number of plates need not be disassembled into individual plates for cleaning, according to the former practice, but rather the entire unit as coated with dust can be washed with a detergent solution such as soap and water, either manually or by placing in a common household dish washer, and then replaced manually into the unit, even when only emperically dried, without danger of short circuit break down of the polyacrylate side piece insulation.

It will be noted that the grill 25 is contiguous with the top and bottom plates 29 and 39, both negative plates, so that the grill becomes grounded therewith and extends protectively over the front end of the tier of plates, protecting both the positive plates as well as the forward positioned high voltage ionizing wire loop 52. Since the cell is removed and the grill 25 might possibly become bent during cleaning, one of the negative plates 35 is extended forward, terminating just short of the grill 25 so that if the grill is bent to contact a plate it will be intercepted by the negative plate 35, thus protecting the assembly against possible short circuiting of the grill against any inwardly spaced positive plate.

As thus described, an air purifier is provided having numerous improvements. It provides a high voltage dust collector cell which is safely manually insertable and removable as a unit from fixed high voltage circuit contacts. The plates of the cell are secured together with non-arcing, stable, dielectric side pieces, preferably of polyacrylate, which do not decompose under high voltage to form short circuiting carbon passageways between plates. Such cell may be formed of a larger number of more closely spaced plates. The cell assembled of alternate positive and negative plates has one corner extending for positive or negative contact, the opposite corner of the plates being notched to avoid contact, whereby the assembly of plates is insertable as a unit. The fixed high voltage circuit is made through the extending corners of each alternate plate group. Helically coiled spring contacts are provided for contacting a group of plates, one for each polarity disposed at opposite ends of the cell. The plates are embossed for optimum firm contact with the resilient coiled spring contacts.

Thus the entire cell is insertable in high voltage circuit manually as a unit and is removable manually as a unit therefrom for cleaning. The cell does not need to be disassembled from its assembly of plates but may be cleaned as a unit by emplacement in any washing type of machine. A grounding circuit is provided for contact with the negative plates including a resilient contact arm which withdraws residual charge from the negative plates so that the user cannot be shocked by manual contact, upon removal for cleaning.

The cell is slideably mounted into a housing to complete the high voltage circuit through its plates, and a fan is mounted adjacent to and parallel to the bottom of the plates, whereby air flows thereover and through the fan blade. The streamline flow is diagonally to the rear and downward for easy flow through the device, making efficient use of the total internal volume comprising the plates and fan blades within a low profile rectangular housing. The air flows in streamline through a grilled lower back portion of the housing and through a grilled adjacent bottom portion of the housing.

High voltage portions of the circuit are encapsulated such as by being encased in plastic for minimizing arcing short circuitry by the high voltage and reducing a consequent tendency to form ozone in the air in contact with an arcing circuit. The encapsulation of the high voltage secondary output of the transformer is doubled and rectified to direct current.

Finally, the total construction is more efficient allowing high voltage precipitation of dust, a larger fan placed for streamlined flow of gas through the precipitator plates whereby the air passes in one side and out the other in streamlined high volume flow through the unit. For maximum reduction of noise the several parts of the metallic housing used for grounding the circuit are sound insulated including areas of the walls which may tend to vibrate as well as the surrounding edge of an annular venturi using sound proofing material for optimum dampening of noisy vibrations.

Other advantages are inherent in the description given and it is intended that the description be regarded as illustrative and not limiting, the scope of the invention being as defined in the claims.

What is claimed is:

1. In a portable dust precipitator, a housing having an opening for receiving a dust collector cell substantially within said housing, a manually insertable and removable dust collector cell in said opening, said cell comprising alternate high voltage positive and negative dust collecting plates vertically spaced from each other and assembled in a tier to provide gas passageways between the plates for precipitation of ionized dust particles carried by the gas upon the plates, a high voltage conductor wire mounted before said assembled plates and in contact with a high voltage supply carried by said plates for ionizing said gas passed into and through said cell, an electric motor driven fan means in said housing for drawing air to be purified flowing first in contact with said ionizing means and then over said plates, electrical circuit means drawing a household power supply of alternating current for actuating said fan means, a transformer means converting a portion of said power supply to high voltage, contact means from said high voltage power supply to the positive plates of said cell, and contact means completing the high voltage circuit separately to negative plates of said cell, both of said contact means being supported by said housing to separately engage positive and negative plates of said cell, said high voltage circuit being made and broken by positive and negative plates of said cell, engaging and disengaging said contact means upon manually inserting and removing said cell from said dust precipitator.

2. The dust precipitator as defined in claim 1 wherein a housing enclosing said fan and motor has an opening at one side through which said cell is manually inserted for engaging said contact means and an opening at an opposite side of said housing for passage of purified gas outward thereof, said fan being mounted with its impeller between said cell through which the air to be purified enters and said opposite side outlet for purified air, said fan having its impeller blades disposed substantially parallel to the air stream passing into and out of said housing.

3. The dust precipitator as defined in claim 2 wherein the fan impeller blades are positioned adjacent to the lower end of the cell, whereby the air after dust precipitation in said cell passes through said fan, then downward through said fan impeller blades, and thence outward through said opposite side of said housing.

4. The dust precipitator as defined in claim 3 wherein the housing has air outlet perforations both at the opposite side and a portion of the bottom adjacent to said opposite side, whereby the air after dust precipitation in said cell passes from said precipitator cell downward through said fan impeller blades and thence diagonally outward, a portion passing outward of said housing through said lower opposite side of said housing and a portion through the bottom perforations adjacent to said perforated opposite side.

5. The dust precipitator as defined in claim 3 wherein the lowermost plate of said cell is arcuately cut away and said cell is positioned inward of said housing engaging said contacts with the innermost end of said cell disposed partially above said fan to subtend a substantial chord across the circular path of said fan therebeneath, and positioned to flow purified air downward substantially into the center of the impeller of said fan.

6. Electronic dust precipitator as defined in claim 1 wherein the dust collector cell comprises positive and negative plates alternately assembled into a tier of parallel plates, each positive plate having an extended corner at one side of said tier for engaging a contact means, and being notched at its opposite corner for avoiding electrical contact, and each alternately disposed negative plate having a similarly extending corner at a side opposite to the extending corner of the positive plates, the negative plates being also notched at their opposite sides, whereby the extending corners of plates of one polarity of the tier are aligned with the notched corners of the plates of opposite polarity, the positive contact means supported by said housing being positioned to engage for electrical circuit contact only the extending positive plate corners, avoiding contact with the notched negative plate corners aligned therewith in the tier when said cell is inserted in operative position in the opening of said housing, the negative contact means supported by said housing being positioned at the opposite corner of said cell to engage for electrical circuit contact only extending negative plate corners, avoiding contact with the notched corners of the positive plate corners aligned therewith.

7. The electronic dust precipitator as defined in claim 6 wherein said high voltage contacts are resilient coiled springs supported vertically in said housing at opposite corners of said cell, each engaging the extended plate corners of opposite polarity and providing high voltage circuit contact to the tier of plates, said spring and plates being positioned and shaped to form a firm resilient electrical circuit contact between each of said spring contacts and a group of plates of the same polarity.

8. The device as defined in claim 6 wherein the extending corners of said plates are embossed to provide a vertical protuberance therein, frictionally engaging the resilient spring coils for firm, frictional, substantially compressed contact between said spring contact element and the extending embossed corners of a group of said plates.

9. The device as defined in claim 8 wherein the embossment in said plates comprises a dimple pressed into the surface of a plate at the extended end.

10. The electronic dust precipitator as defined in claim 1 including a separate delayed grounding contact positioned to maintain delayed circuit contact with the negative plates of said cell, whereby upon cell insertion into said housing the cell first engages said delayed grounding contact for immediate grounding of negative plates before other circuit completion is effected, and remains in grounding circuit with said grounding contact until after breaking of other circuit contacts when the cell is removed.

11. The device as defined in claim 6 wherein said cell has its upper negative plate corner extending a substantial distance inward of the other plates of said cell, the opposite corner of said plate being notched, a switch mounted in said housing near said extending plate corner and having a resilient arm, positioned for engagement by said plate corner upon insertion and removal of said cell into and from said housing, said resilient switch arm being in circuit with a ground lead whereby to intercept the extended corner of said top plate, grounding the same as it is moved into and out of high voltage contact with the high voltage circuit, whereby to ground the charge upon the negative plates both upon insertion and removal of said cell from contact with the high voltage current supply.

12. The device as defined in claim 11 including a switch having contacts bridged by said resilient switch arm in depressed position completing the power input to said dust collector cell, said switch arm extending resiliently outward of said circuit completing contacts and first engaging said extended edge of said top negative plate upon insertion of the said cell, said resilient arm being pressed by said extending edge inward to bridge said contacts as the cell is fully inserted in said housing and for completion of high voltage contact to its plates, said switch arm first effecting a grounding of said negative plates upon partial insertion of the cell by said resiliently extending arm and then effecting closure of the power supply circuit by bridging said contacts upon full insertion of said cell, and said switch arm first breaking said power supply circuit as the cell is partially removed, said arm resiliently continuing the grounding of said negative plates after the power supply circuit is broken.

13. A dust collector cell for a high voltage dust precipitator, said cell comprising alternate positive and negative plates vertically spaced from each other and assembled in a tier to provide gas passageways between the plates for precipitation of ionized dust particles carried by the gas upon the plates, said plates having their sides encased in supporting side pieces of di-electric material, a high voltage ionizing wire loop supported in tension between said di-electric side pieces and spaced before the leading edges of most of the plates comprising said tier of parallel plates, and contact means between one of the positive plates of said tier and said loop supplying an ionizing charge to said wire loop.

14. The dust collector cell as defined in claim 13 wherein said side encasing dielectric material is resistant to carbon formation by high voltage arcing between plates.

15. The dust collector cell as defined in claim 14 wherein the dielectric material comprising said side pieces is formed of a polylower acrylate ester.

16. The dust collector cell as defined in claim 14 wherein the said dielectric side pieces are formed of polymethyl methacrylate.

17. The dust collector cell as defined in claim 14 wherein the inner ends of the plates of said cell are further reinforced by a vertical bracketing member of dielectric material extending from plate to plate of said tier and supporting each plate.

18. The dust collector cell as defined in claim 13 wherein the forward end of said tier of plates is encased in a protective grill contiguous with the top and bottom negative plates, one of said negative plates being extended forwardly and protectively of the plates to a point close to but not in contact with said grill, whereby any mechanical deformation of said grill in use of said cell at high voltage will being the grill only into contact with said negative plate.

19. Dust collector cell as defined in claim 15 wherein said plates and plastic side pieces are notched at their sides, and the plates after assembling in a tier aligned with the notched in their sides are fixed in aligned assembly by a plastic plug fitted into the notched sides.

20. The dust collector cell as defined in claim 13 wherein each positive plate has an extended corner at one side of said tier for engaging a contact means and being notched at its opposite corner for avoiding electrical contact, and each alternately disposed negative plate has a similarly extending corner at a side opposite to the extending corners of the positive plates, the negative plates being also notched at their opposite sides, whereby the extending corners of plates of one polarity of the tier are aligned with the notched corners of the plates of opposite polarity.

21. In a portable dust precipitator, a housing having a dust collector cell mounted therein, said cell comprising alternate high voltage positive and negative dust collecting plates vertically spaced from each other and assembled in a tier to provide gas passageways between the plates for precipitation of ionized dust particles carried by the gas upon the plates, a high voltage conductor wire mounted from side to side before said assembled plates in contact with a high voltage supply for ionizing gas passed into and through said cell, an electric motor driven fan means in said housing for drawing air to be purified first in contact with said conductor wire ionizing means and then over said plates, electrical circuit means drawing a household power supply of alternating current for actuating said fan means, transformer means converting a portion of said power supply to high voltage, and a doubler circuit in contact with the high voltage output of said transformer means doubling and rectifying said transformer output to double the current, and contact means mounted in circuit with said doubly high voltage power supply for separately engaging the positive and negative plates of said cell and energizing said high voltage ionizing conductor wire.

22. The portable dust precipitator as defined in claim 21 wherein said doubler circuit is encapsulated in plastic, reducing the tendency of its high voltage components from arcing contact with structural elements of said device.

23. The device as defined in claim 21 wherein said housing has an opening through which said cell may be manually inserted and removed, a pair of high voltage contacts in circuit with said high voltage doubler fixedly mounted to the walls of said housing at opposite ends of said cell, each in position to engage a group of plates of one polarity when said cell is emplaced within said housing, whereby, upon inserting said cell manually through said opening into said housing, the positive plates become frictionally contacted to complete their high voltage circuit to positive contacts and the negative plates of said cell become frictionally contacted to complete their high voltage circuit to the negative contact in said housing.

24. The dust precipitator as defined in claim 21 wherein said housing has an opening through which said cell may be manually inserted and removed, a pair of high voltage contacts in circuit with a high voltage doubler fixedly mounted to the walls of said housing at opposite ends of said cell, each in position to engage a group of plates of one polarity when said cell is emplaced within said housing, said dust collector cell comprising positive and negative plates alternately assembled into a tier of parallel plates, each positive plate having an extending corner at one side of said tier for engaging a contact means and being notched at its opposite corner for avoiding electrical contact, and each alternately disposed negative plate having a similarly extending corner at a side opposite to the extending corner of the positive plates, the negative plates being also notched at their opposite sides, whereby the extending corners of plates of one polarity of the tier are aligned with the notched corners of the plates of opposite polarity, the positive contact means supported by said housing being positioned to engage for electrical circuit contact only the extending positive plate corners, avoiding contact with the notched negative plate corners aligned therewith in the tier when said cell is inserted in operative position in the opening of said housing, the negative contact means supported by said housing being positioned at the opposite corner of said cell to engage for electrical circuit contact only extending negative plate corners, avoiding contact with the notched corners of the positive plate corners aligned therewith, whereby upon inserting said cell manually the positive plates become frictionally contacted to complete their high voltage circuit to one of said contacts and the negative plates of said cell are placed manually in frictional contact with the negative contact in said housing.

25. The device as defined in claim 24 wherein said contacts are springs mounted in tension at opposite sides of said housing and each are positioned to receive the notched corners of a group of plates, one for positive and the other for negative.

26. The device as defined in claim 24 wherein the extending ends of each plate for contact with said springs are each embossed to form a firm, frictional, resilient contact with each spring upon insertion of the collector cell into the housing.

27. In a portable dust precipitator, a housing having an opening at one side for receiving a dust collector cell substantially within said housing, and an outlet grill at an opposite housing side for exhaust of purified air, said dust collector cell comprising alternately assembled positive and negative plates and an ionizing wire positioned before said plates for ionizing gas passing to said plates, an electrical motor driven fan means in said housing, said cell being positioned in said housing opening before the impeller of said fan whereby said impeller draws air through said cell for ionization and precipitation of dust therefrom upon said plates through the impeller of said fan and thence outward through the outlet grill in said housing, electrical circuit means for actuating said fan motor including transformer means converting a portion of the current to high voltage and contact means for said high voltage to the positive plates of said cell, said housing being formed of metal and forming a grounding conductor for said circuit means, said fan impeller being encased in a metallic venturi whereby the air emitted from said cell passes through said venturi into the impeller of said fan and thence outward of said housing, and noise insulating means within said housing dampening vibrations of the metal thereof.

28. The device as defined in claim 27 wherein the sound insulating means comprises a plastic collar fitted about said venturi opening to dampen metallic vibrations therein.

29. The device as defined in claim 27 wherein the sound insulating means comprises foamed plastic strips mounted upon the walls and in the joints of said housing whereby to dampen the vibrational noise thereof.

30. The dust collector cell as defined in claim 13 wherein a spring arm is rigidly fastened to one of said side pieces, said spring arm having ends resiliently extending outward thereof, said high voltage ionizing wire loop being passed over the outwardly extending ends of said spring arm and being secured at the center thereof for contact with one of the positive plates in said tier, said spring arm applying resilient tension to said wire loop.

31. In a portable dust precipitator, a low profile rectangular housing enclosing an air impeller centrally mounted between top and bottom for rotation in a plane parallel thereto, an electric motor drivingly connected to said impeller, an opening in one side of said housing for manually inserting a dust collector cell, a high voltage current supply in circuit with a pair of contacts supported by said housing on opposite sides of said opening, said cell comprising a high voltage ionizing wire supported in contact with positive plates of parallel alternate layers of closely spaced plates, each plate of one polarity being inserted in circuit with one of said contacts of the same polarity, and each alternate plate of opposite polarity being inserted in contact with the contact of its polarity upon manual insertion of said cell into said housing opening with the plates in circuit with said contacts and high voltage circuit, an air stream outlet grill on the housing side below and opposite to said housing opening, said cell extending through said opening with its plates terminating above said impeller, whereby said impeller draws air through the said opening passing into said housing through said parallel plates, precipitating suspended dust thereon, thence through said impeller and outward through the opposite housing side outlet grill in streamline flow.

* * * * *